US009151638B2

(12) United States Patent
Kagawa et al.

(10) Patent No.: US 9,151,638 B2
(45) Date of Patent: Oct. 6, 2015

(54) ROTATING ELECTRIC MACHINE

(71) Applicant: KABUSHIKI KAISHA YASKAWA DENKI, Kitakyushu-shi (JP)

(72) Inventors: Ryuta Kagawa, Kitakyushu (JP); Kenji Matsuura, Kitakyushu (JP); Koji Uemura, Kitakyushu (JP)

(73) Assignee: KABUSHIKI KAISHA YASKAWA DENKI, Kitakyushu-Shi (JP)

( * ) Notice: Subject to any disclaimer, the term of this patent is extended or adjusted under 35 U.S.C. 154(b) by 126 days.

(21) Appl. No.: 13/853,059

(22) Filed: Mar. 29, 2013

(65) Prior Publication Data

US 2013/0278249 A1    Oct. 24, 2013

(30) Foreign Application Priority Data

Apr. 18, 2012  (JP) ................................. 2012-094923

(51) Int. Cl.
  *G01D 5/14*  (2006.01)
  *G01D 5/245*  (2006.01)
  *H02K 11/00*  (2006.01)

(52) U.S. Cl.
  CPC ............... *G01D 5/145* (2013.01); *G01D 5/245* (2013.01); *H02K 11/0026* (2013.01)

(58) Field of Classification Search
  CPC ....... G01D 5/145; G01D 5/142; G01D 5/147; G01D 5/3473; G01D 5/34738; G01D 5/245; G01R 33/06; H02K 11/0026; H02K 3/522
  USPC ....................................... 324/207.11–207.26
  See application file for complete search history.

(56) References Cited

U.S. PATENT DOCUMENTS

| 4,743,882 | A  | * | 5/1988  | Simon ........................... 338/184 |
| 5,827,956 | A  | * | 10/1998 | Beste et al. ..................... 73/146 |
| 6,608,300 | B2 | * | 8/2003  | Meschko ................. 250/231.13 |
| 7,891,461 | B2 | * | 2/2011  | Miyoshi et al. ............... 180/443 |
| 2005/0145448 | A1 | * | 7/2005  | Watanabe et al. ............ 188/72.1 |

(Continued)

FOREIGN PATENT DOCUMENTS

| CN | 2671216 Y | 12/2005 |
| JP | 02-57771 U | 4/1990 |
| JP | 3602404 B2 | 10/2001 |
| JP | 2007-181315 | 7/2007 |

OTHER PUBLICATIONS

Japanese Office Action for corresponding JP Application No. 2012-094923, Jan. 21, 2014.

(Continued)

*Primary Examiner* — Tung X Nguyen
*Assistant Examiner* — David Frederiksen
(74) *Attorney, Agent, or Firm* — Mori & Ward, LLP

(57) ABSTRACT

A rotating electric machine according to the embodiments includes a rotating-electric-machine unit, a rotation detector, an Oldham coupling, and a washer. The rotating-electric-machine unit includes a shaft. The rotation detector includes a body and a rotation input pin that is rotatably provided on the body. The Oldham coupling couples the rotation input pin of the rotation detector and the shaft to each other while allowing any relative displacement in a direction intersecting an axial direction. The washer is provided on the rotating-electric-machine unit while being positioned with respect to the shaft. The washer includes an attaching portion at which the body of the rotation detector is attached to the washer.

7 Claims, 7 Drawing Sheets

(56) References Cited

U.S. PATENT DOCUMENTS

2006/0170282 A1* 8/2006 Yamaguchi et al. ............ 303/20
2008/0003853 A1* 1/2008 Tanaka et al. ................. 439/164
2010/0141067 A1* 6/2010 Kitagawa ........................ 310/71
2012/0210816 A1* 8/2012 Izumi ........................ 74/490.03
2012/0286629 A1* 11/2012 Johnson et al. ............. 310/68 B

OTHER PUBLICATIONS

Chinese Office Action for corresponding CN Application No. 201310130473.9, Mar. 20, 2015.

* cited by examiner

ROTATING ELECTRIC MACHINE

CROSS-REFERENCE TO RELATED APPLICATIONS

The present disclosure contains subject matter related to that disclosed in Japanese Priority Patent Application JP 2012-094923 filed in the Japan Patent Office on Apr. 18, 2012, the entire contents of which are hereby incorporated by reference.

BACKGROUND OF THE INVENTION

1. Field of the Invention

The embodiments disclosed herein relate to rotating electric machines.

2. Description of the Related Art

Rotating electric machines including rotation detectors such as encoders are hitherto proposed. A rotation detector detects the rotational position of a shaft of a rotating electric machine by detecting the rotational position of a rotation input pin that is coupled to the shaft of the rotating electric machine and rotates together with the shaft.

In a related-art rotating electric machine, a rotation input pin of a rotation detector and a shaft of the rotating electric machine are coupled to each other with a leaf spring, whereby any axial displacement between the shaft and the rotation input pin is absorbed by the leaf spring (see Japanese Unexamined Patent Application Publication No. 2007-181315, for example).

SUMMARY OF THE INVENTION

According to an aspect of the disclosure, there is provided a rotating electric machine including a rotating-electric-machine unit including a shaft, a rotation detector including a body and a rotation input pin that is rotatably provided on the body, an Oldham coupling that couples the rotation input pin of the rotation detector and the shaft to each other while allowing any relative displacement in a direction intersecting an axial direction, and a washer provided on the rotating-electric-machine unit while being positioned with respect to the shaft, the washer including an attaching portion at which the body of the rotation detector is attached to the washer.

DESCRIPTION OF THE EMBODIMENTS

Embodiments of the rotating electric machine disclosed by the present application will now be described in detail with reference to the accompanying drawings. While the following description concerns an exemplary case where the rotating electric machine disclosed by the present application is a motor, the rotating electric machine disclosed by the present application may be a generator. In addition, the following embodiments do not limit the present application.

First Embodiment

Figure 1:
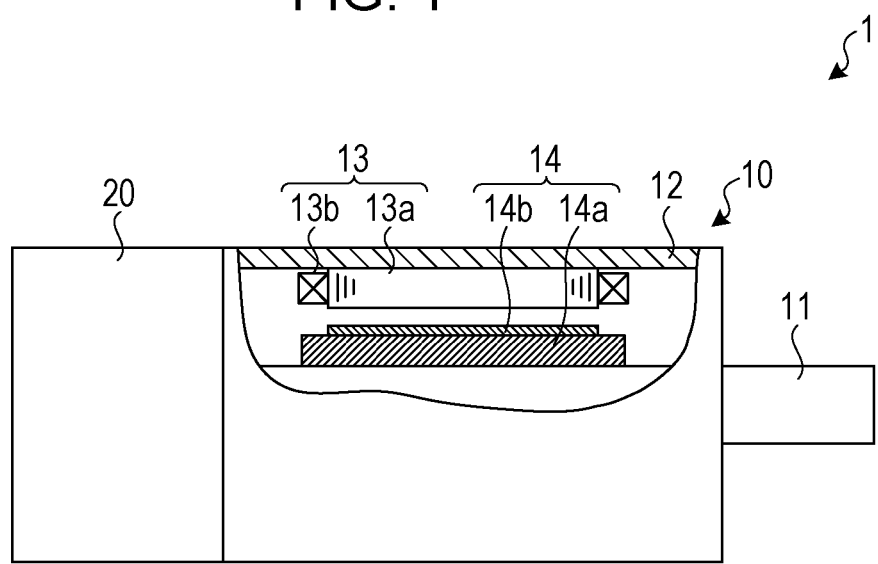
FIG. 1 is a schematic side view illustrating a configuration of a motor according to a first embodiment.
Figure 1:
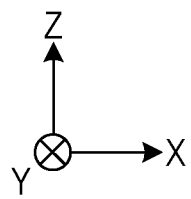

FIG. 1 is a schematic side view illustrating a configuration of a motor according to a first embodiment. As illustrated in FIG. 1, a motor 1 according to the first embodiment is an encoder-equipped motor and includes a motor unit 10 and an encoder unit 20. Hereinafter, to clarify the positional relationship, an X axis and a Y axis that are orthogonal to each other are set, and the positive direction of a Z axis is defined as a vertically upward direction.

The motor unit 10 includes a shaft 11, a housing 12, a stator 13, and a rotor 14. The shaft 11 is a substantially columnar member that is rotatably supported by the housing 12.

The housing 12 supports the shaft 11 with a non-illustrated bearing interposed therebetween and such that the shaft 11 is rotatable. The stator 13 is fixed to the inner circumference of the housing 12. The stator 13 includes a stator core 13a and a stator coil 13b. The rotor 14 is provided on the inner circumferential side of the stator 13 in such a manner as to face the stator 13 with an air gap. The rotor 14 includes a substantially cylindrical rotor core 14a provided around the outer circumference of the shaft 11, and a plurality of permanent magnets 14b provided on the outer circumference of the rotor core 14a. The rotor 14 rotates coaxially with the shaft 11.

In the motor unit 10 configured as described above, when an electric current flows through the stator coil 13b of the stator 13, a rotating magnetic field is produced on the inner side of the stator 13. With the interaction between the rotating magnetic field and magnetic fields produced by the permanent magnets 14b of the rotor 14, the rotor 14 rotates. With the rotation of the rotor 14, the shaft 11 rotates.

The encoder unit 20 is provided on a counter load side of the motor unit 10. The encoder unit 20 includes an encoder that detects the rotational position of the shaft 11. The encoder includes a body including thereinside elements such as a detecting element and a substrate, and a rotation input pin rotatably provided on the body. The rotation input pin of the encoder is coupled to the shaft 11 of the motor unit 10. The encoder detects the rotational position of the shaft 11 by detecting the rotational position of the rotation input pin that rotates together with the shaft 11.

Here, in the motor 1 according to the first embodiment, the rotation input pin of the encoder and the shaft 11 are coupled to each other with an Oldham coupling. The Oldham coupling is a shaft coupling that couples two shafts while allowing any relative displacement in a direction intersecting the axial direction.

Coupling of shafts by using an Oldham coupling is realized by fitting a key provided to one of each shaft and the Oldham coupling into a key groove provided in the other. Hence, unlike a leaf-spring shaft coupling and the like, two shafts can be coupled to each other without using any fastening members such as screws. Therefore, the rotation input pin of the encoder is easily attachable to/detachable from the shaft 11.

The Oldham coupling is capable of transmitting rotation from the shaft 11 to the rotation input pin even if there is any displacement between the axis of the rotation input pin and the axis of the shaft 11. However, the amount of axial displacement allowed by the Oldham coupling is smaller than that of the leaf-spring shaft coupling or the like. Therefore, in a situation where any axial displacement tends to occur, for example, in a case where the shaft 11 has a large diameter and there is a large variation in the axial position corresponding to dimensional tolerances, an axial displacement exceeding the amount of axial displacement allowed by the Oldham coupling may occur.

Hence, the motor 1 according to the first embodiment is provided with a washer for establishing the concentricity between the rotation input pin of the encoder and the shaft 11. That is, a washer is attached to the motor unit 10, and the washer and the shaft 11 are centered with respect to each other. Subsequently, the body of the encoder is fixed to the washer. In this manner, the axis of the rotation input pin of the encoder and the axis of the shaft 11 are made to coincide with each other, regardless of the dimensional tolerances of the shaft 11.

Figure 2:
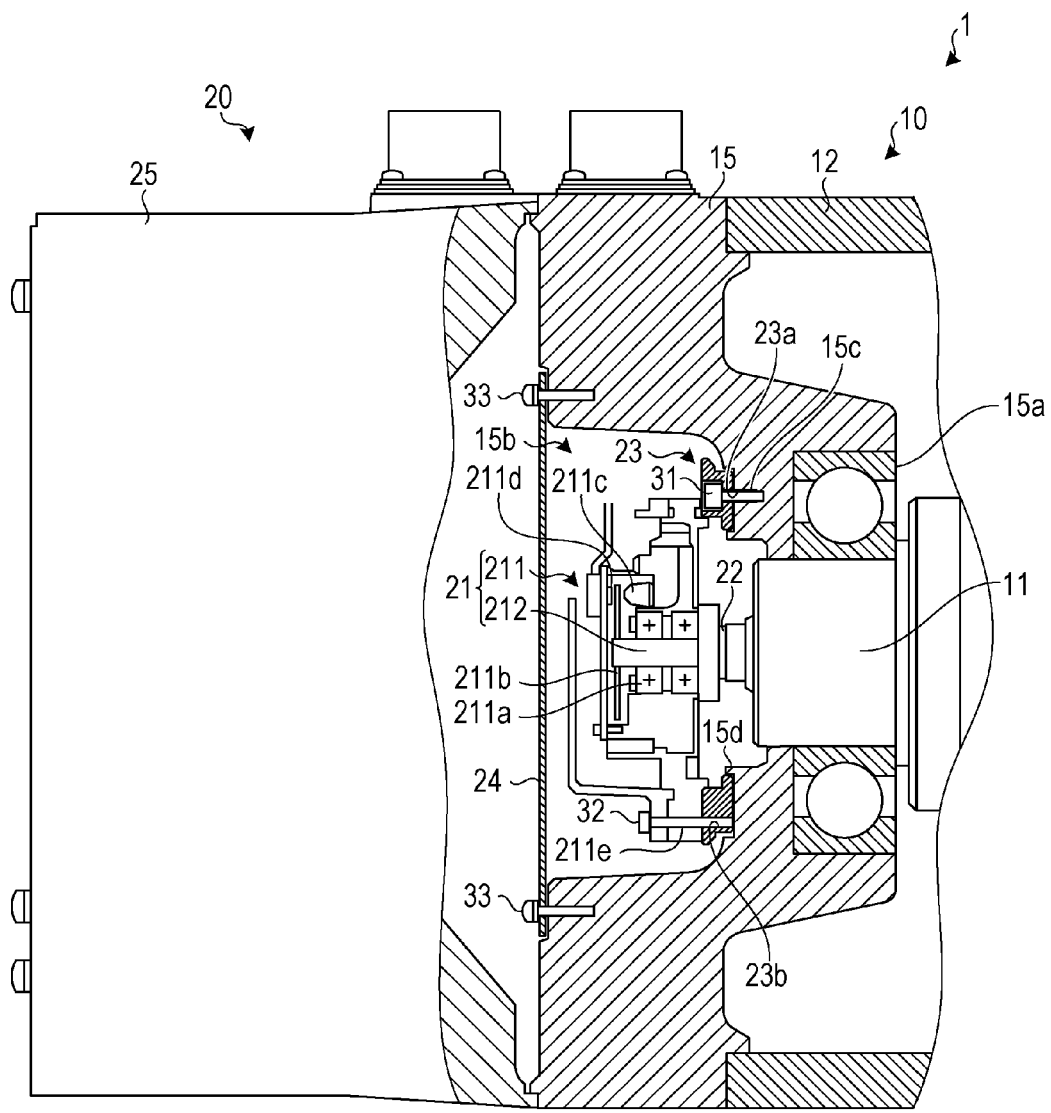
FIG. 2 is a schematic sectional side view of the motor.

The configuration of the motor 1 described above will further be described specifically. FIG. 2 is a schematic sectional side view of the motor 1.

A configuration of the motor unit 10 will first be described. As illustrated in FIG. 2, the motor unit 10 further includes a counter-load-side bracket 15. The counter-load-side bracket 15 is a member that covers the counter load side of the motor unit 10 and is fitted in the housing 12. The counter-load-side bracket 15 is provided with a bearing 15a, with which the shaft 11 is rotatably supported. The shaft 11 slightly projects from the counter-load-side bracket 15.

The counter-load-side bracket 15 has such a shape that a central portion thereof projects toward the motor unit 10. Hence, the counter-load-side bracket 15 has a recess 15b on a side thereof nearer to the encoder unit 20.

A configuration of the encoder unit 20 will now be described. The encoder unit 20 includes an encoder 21, an Oldham coupling 22, and a washer 23.

The encoder 21 is a rotation detector that detects the rotational position of the shaft 11. The encoder 21 includes a body 211 and a rotation input pin 212. The body 211 is fixed to the washer 23 to be described below, thereby being fixed to the counter-load-side bracket 15 with the washer 23 interposed therebetween. The rotation input pin 212 is coupled to the shaft 11 of the motor unit 10 with the Oldham coupling 22, to be described below, interposed therebetween, thereby rotating together with the shaft 11.

The body 211 preferably includes a bearing 211a, a disc 211b, a light-emitting element 211c, and a light-receiving element 211d. The bearing 211a supports the rotation input pin 212 such that the rotation input pin 212 is rotatable. The disc 211b is a substantially circular plate-like member having a predetermined slit pattern and is fixed to an end of the rotation input pin 212, thereby rotating together with the rotation input pin 212. The light-emitting element 211c and the light-receiving element 211d are provided across the disc 211b from each other.

In the encoder 21 configured as described above, when the shaft 11 rotates, the rotation input pin 212 rotates, whereby the disc 211b of the body 211 rotates. Furthermore, in the encoder 21, the light-emitting element 211c emits light toward the disc 211b, light transmitted through the slit pattern of the disc 211b is received by the light-receiving element 211d, and a number of pulses corresponding to the number of times of light reception by the light-receiving element 211d is output, whereby the positional change and so forth of the shaft 11 are determined.

The encoder 21 according to the first embodiment is a so-called complete-type encoder, in which the body 211 and the rotation input pin 212 are integrated together in advance.

That is, the encoder 21 is provided in a state where the rotation input pin 212 is positioned in advance with respect to the body 211.

Figure 3:
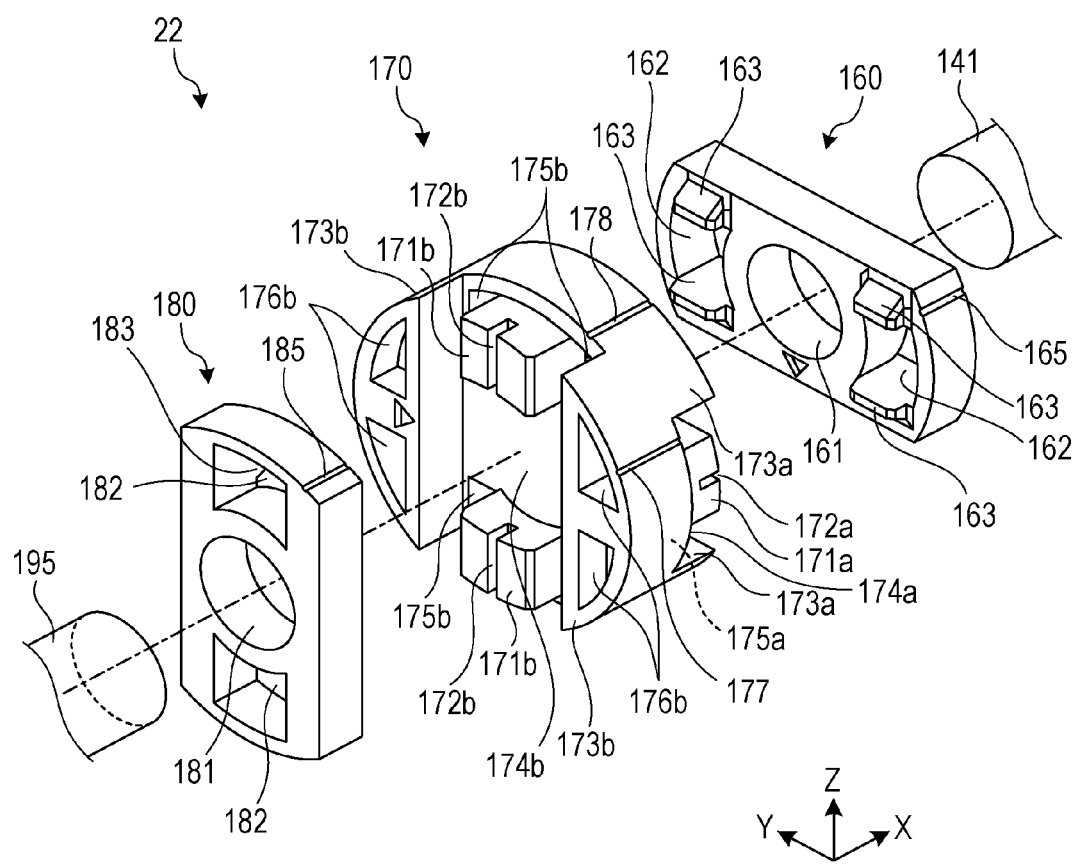
FIG. 3 is a diagram illustrating a configuration of an Oldham coupling illustrated in FIG. 2.

The Oldham coupling 22 is a shaft coupling that couples the rotation input pin 212 of the encoder 21 and the shaft 11 to each other while allowing any relative displacement in a direction intersecting the axial direction. Here, a configuration of the Oldham coupling 22 will be described with reference to FIG. 3. FIG. 3 is a diagram illustrating the configuration of the Oldham coupling 22 illustrated in FIG. 2.

As illustrated in FIG. 3, the Oldham coupling 22 includes a first hub 160, a slider 170, and a second hub 180. The first hub 160 and the second hub 180 are made of, for example, metal such as an aluminum alloy. The slider 170, which functions as an intermediate coupling, is made of resin such as acetal resin or nylon resin. Therefore, heat transmission between the shafts is suppressed. The first hub 160 and the second hub 180 may be made of resin instead of metal.

The first hub 160 has a center hole 161 provided in a central portion thereof and functioning as a shaft hole, and two side holes 162 provided on both radial sides of the center hole 161 symmetrically to each other with respect to the center hole 161. Likewise, the second hub 180 has a center hole 181 provided in a central portion thereof and functioning as a shaft hole, and two side holes 182 provided on both radial sides of the center hole 181 symmetrically to each other with respect to the center hole 181.

As described above, the first and second hubs 160 and 180 each have the side holes 162 or 182 (corresponding to key grooves). The side holes 162 and 182 function as regions that engage with the slider 170. Hence, the increase in the thickness of the Oldham coupling 22 in the axial direction (X direction) is suppressed.

The first hub 160 also has projections 163 provided on both sides of each of the side holes 162 in the Z direction and each having a substantially trapezoidal sectional shape. The first hub 160 also has an assembly groove 165 in an outer circumferential surface thereof. Likewise, the second hub 180 has projections 183 provided on both sides of each of the side holes 182 in the Y direction and each having a substantially trapezoidal sectional shape. The second hub 180 also has an assembly groove 185 in an outer circumferential surface thereof.

The slider 170 includes projections 171a and 171b rising from flat portions 174a and 174b. Two projections 171a are arranged side by side in the Y direction, while two projections 171b are arranged side by side in the Z direction. That is, the direction in which the projections 171a are arranged and the direction in which the projections 171b are arranged are at substantially 90 degrees with respect to each other. The projections 171a have respective slits 172a, and the projections 171b have respective slits 172b.

Furthermore, the slider 170 has, on both sides of each of the projections 171a and 171b, sidewalls 173a or 173b rising from the flat portion 174a or 174b. The sidewalls 173b are on the back of the projections 171a. The sidewalls 173a are on the back of the projections 171b. Therefore, the strength of the slider 170 in the axial direction (X direction) is increased, and the thickness of the slider 170 in the axial direction can be reduced.

The slider 170 also has recesses 175a that are provided on both sides of each of the projections 171a and are depressed from the flat portion 174a, and, likewise, recesses 175b that are provided on both sides of each of the projections 171b and are depressed from the flat portion 174b. The slider 170 also has assembly grooves 177 and 178 in an outer circumferential surface thereof.

The first hub 160, the slider 170, and the second hub 180 that are configured as described above in combination form the Oldham coupling 22. Now, a method of assembling the Oldham coupling 22 will be described.

A coupling pin 141 is fitted into the center hole 161 of the first hub 160, whereby the first hub 160 and the coupling pin 141 are coupled to each other. The coupling pin 141 is a pin projecting from an end of the shaft 11 nearer to the encoder unit 20 and being parallel to the axial direction of the shaft 11. The coupling pin 141 is provided coaxially with the shaft 11.

Furthermore, a coupling pin 195 of the rotation input pin 212 is fitted into the center hole 181 of the second hub 180, whereby the coupling pin 195 of the rotation input pin 212 is coupled to the second hub 180. The coupling pin 195 is a pin projecting from an end of the rotation input pin 212 nearer to the shaft 11 and being parallel to the axial direction of the rotation input pin 212. The coupling pin 195 is provided coaxially with the rotation input pin 212.

Furthermore, the projections 171a of the slider 170 are fitted into the side holes 162 of the first hub 160, and the recesses 175a of the slider 170 are fitted onto the projections 163 of the first hub 160, whereby the first hub 160 is fitted onto the slider 170. Likewise, the projections 171b of the slider 170 are fitted into the side holes 182 of the second hub 180, and the recesses 175b of the slider 170 are fitted onto the projections 183 of the second hub 180.

The projections 171a and 171b have the respective slits 172a and 172b. Therefore, the projections 171a and 171b are each flexible in a direction intersecting a direction in which a corresponding one of the slits 172a and 172b extends. In addition, the sidewalls 173b each have two recesses 176b so that the thickness of the sidewalls 173b does not become large. Therefore, the sidewalls 173b are flexible. The same applies to the sidewalls 173a. Hence, the first and second hubs 160 and 180 are fitted onto the slider 170 with high slidability.

The first hub 160 and the second hub 180 have similar configurations. Hence, the first hub 160 is attached to the slider 170 such that the assembly groove 165 of the first hub 160 and the assembly groove 177 of the slider 170 are continuous with each other, and the second hub 180 is attached to the slider 170 such that the assembly groove 185 of the second hub 180 and the assembly groove 178 of the slider 170 are continuous with each other, whereby assembly work is facilitated.

The behavior of the Oldham coupling 22 that is assembled as described above will now be described. The coupling pin 141 rotates with the rotation of the shaft 11, whereby the first hub 160 rotates. With the rotation of the first hub 160, the slider 170 and the second hub 180 rotate, and the coupling pin 195 rotates. With the rotation of the coupling pin 195, the rotation input pin 212 of the encoder 21 rotates.

In a case where the axes of the coupling pin 141 and the coupling pin 195 do not coincide with each other and are eccentric to each other, the projections 171a and 171b of the slider 170 of the Oldham coupling 22 slide within the respective side holes 162 and 182 of the hubs 160 and 180 and the eccentricity is thus absorbed, whereby the rotation of the coupling pin 141 is transmitted to the coupling pin 195. In a case where the axes of the coupling pin 141 and the coupling pin 195 do not coincide with each other and are at angles that are deflected from each other also, the projections 171a and 171b of the slider 170 of the Oldham coupling 22 slide within the respective side holes 162 and 182 of the hubs 160 and 180 and the eccentricity is thus absorbed, whereby the rotation of the coupling pin 141 is transmitted to the coupling pin 195.

As described above, with the Oldham coupling 22, since the first and second hubs 160 and 180 are fitted onto the slider 170 with high slidability, accurate transmission of rotation is realized. Moreover, unlike the leaf-spring shaft coupling and the like, no fastening members such as screws are used. Therefore, the rotation input pin 212 is easily attachable to/detachable from the shaft 11.

Furthermore, since the slider 170 has the sidewalls 173a and 173b, the strength of the slider 170 is increased. Therefore, the thickness of the slider 170 in the axial direction can be reduced.

Referring now to FIG. 2, the washer 23 will be described. The washer 23 is a member attached to the counter-load-side bracket 15 of the motor unit 10 and is provided for alignment between the axes of the rotation input pin 212 of the encoder 21 and the shaft 11.

Figure 4A:
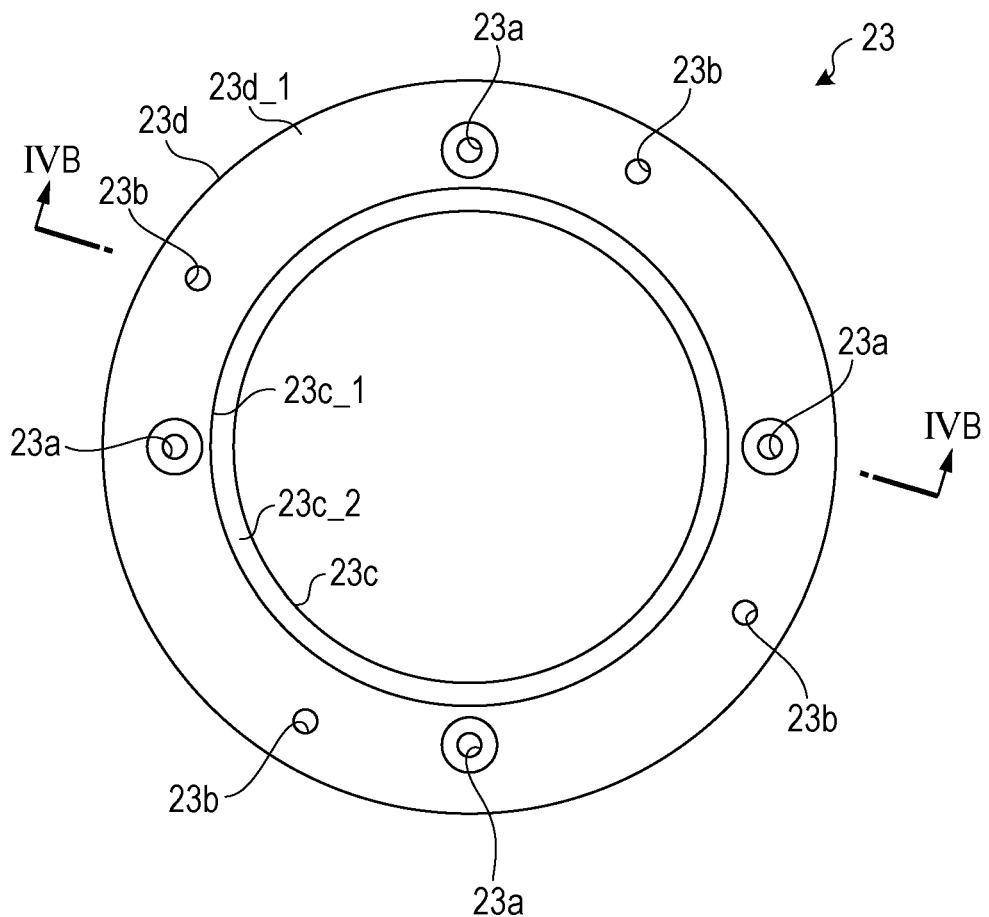
FIG. 4A is a schematic front view of a washer illustrated in FIG. 2.
Figure 4B:
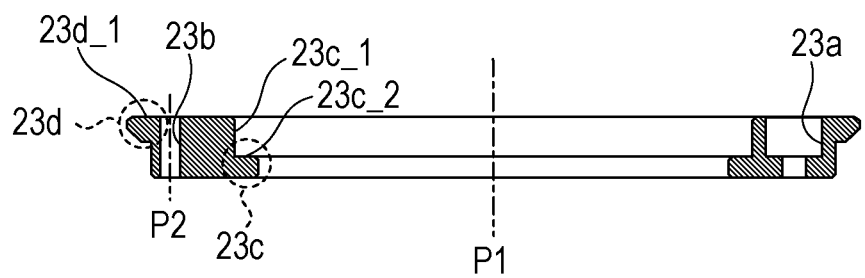
FIG. 4B is a schematic sectional view taken along line IVB-IVB and seen in the direction of the arrows in FIG. 4A.

A configuration of the washer 23 will now be described with reference to FIGS. 4A and 4B. FIG. 4A is a schematic front view of the washer 23 illustrated in FIG. 2. FIG. 4B is a schematic sectional view taken along line IVB-IVB and seen in the direction of the arrows in FIG. 4A. FIG. 4A is a schematic front view of the washer 23 illustrated in FIG. 2 seen from a side thereof on which the encoder 21 is provided.

As illustrated in FIGS. 4A and 4B, the washer 23 is a substantially cylindrical member having openings at two ends thereof. The washer 23 has first screw holes 23a and second screw holes 23b that extend therethrough from one of end faces thereof in the X direction to the other.

The first screw holes 23a function as attaching portions into which screws 31 (see FIG. 2) that fix the washer 23 to the counter-load-side bracket 15 are to be inserted. While four first screw holes 23a are provided in the washer 23 at an interval of substantially 90 degrees in the example illustrated in FIG. 4A, the number of first screw holes 23a is not limited thereto.

The diameter of the first screw holes 23a is slightly larger than the diameter of the screws 31 (see FIG. 2). Hence, the worker or the like can finely adjust the position of the washer 23 after temporarily fastening the washer 23 to the counter-load-side bracket 15.

The second screw holes 23b function as attaching portions into which screws 32 (see FIG. 2) that fix the body 211 of the encoder 21 to the washer 23 are to be inserted. As with the first screw holes 23a, while four second screw holes 23b are provided in the washer 23 at an interval of substantially 90 degrees in the example illustrated in FIG. 4A, the number of second screw holes 23b is not limited thereto.

The second screw holes 23b are each provided at such a position that the distance from a center position P1 of an inner circumference 23c_1 of the washer 23 to a center position P2 of the second screw hole 23b is the same as the distance from the center position of each of screw holes 211e (see FIG. 2) provided in the body 211 of the encoder 21 to the axis of the rotation input pin 212 (see FIG. 2).

Hence, when the body 211 of the encoder 21 is fixed to the washer 23 by inserting the screws 32 (see FIG. 2) into the second screw holes 23b and the screw holes 211e (see FIG. 2), the axis of the rotation input pin 212 comes to coincide with the center position P1 of the inner circumference 23c_1 of the washer 23.

The washer 23 further includes a first flange 23c and a second flange 23d. The first flange 23c is a flange provided by making the inner circumference of an end face thereof nearer to the counter-load-side bracket 15 project radially inward. The first flange 23c is provided for rough positioning of the washer 23.

The second flange 23d is a flange provided by making the outer circumference of an end face thereof nearer to the body 211 of the encoder 21 project radially outward. With the second flange 23d, the washer 23 preferably has, in the end face thereof, a region 23d_1 that is flat over the entirety of the periphery thereof without the first screw holes 23a and the second screw holes 23b. The region 23d_1 (hereinafter referred to as "flat region 23d_1") is used in making the washer 23 perpendicular to the axial direction of the shaft 11 as to be described below.

A process of positioning the washer 23 will now be described. The worker or the like first positions the washer 23 with respect to the counter-load-side bracket 15. In this step, the worker or the like positions the washer 23 with respect to the counter-load-side bracket 15 such that the positions of the first screw holes 23a provided in the washer 23 coincide with the positions of screw holes 15c (see FIG. 2) provided in the counter-load-side bracket 15. Subsequently, the worker or the like inserts the screws 31 into the first screw holes 23a and the screw holes 15c, and loosely fixes (temporarily fastens) the washer 23 to the counter-load-side bracket 15.

In positioning the washer 23 with respect to the counter-load-side bracket 15, the worker or the like brings the inner circumferential surface of the first flange 23c of the washer 23 into contact with a guide 15d provided on the counter-load-side bracket 15. Thus, the washer 23 is roughly positioned. Therefore, the positioning of the first screw holes 23a and associated work are facilitated. To enable fine adjustment of the position of the washer 23, a small gap is provided between the guide 15d of the counter-load-side bracket 15 and the first flange 23c of the washer 23.

Subsequently, the worker or the like performs centering of the washer 23. Specifically, the worker or the like attaches a measuring instrument intended for centering onto the shaft 11, and measure the displacement between the center position P1 (see FIG. 4B) of the inner circumference 23c_1 of the washer 23 and the axis of the shaft 11 by using the measuring instrument.

Here, the measuring instrument for centering is, for example, a small tester, a dial gauge, or the like and is used for measuring the displacement (the degree of eccentricity) from a reference axis. The displacement is obtained by measuring the distance from the reference axis at different positions along the circumferential direction.

For example, in a case where a dial gauge is used as the measuring instrument for centering, the shaft 11 is rotated by one revolution while the tip (measuring element) of the dial gauge attached to the shaft 11 is kept pressed against the inner circumference 23c_1 of the washer 23, whereby the displacement is measured. After finely adjusting the position of the washer 23 such that the displacement is reduced, the worker or the like performs the above measurement with the measuring instrument again.

Furthermore, when the displacement between the center position P1 of the inner circumference 23c_1 of the washer 23 and the axis of the shaft 11 becomes a predetermined value or smaller (for example, 0), the worker or the like performs final fastening of the screws 31. Thus, preferably, the washer 23 is fixed to the counter-load-side bracket 15 in a state where the center position P1 of the inner circumference 23c_1 coincides with the axis of the shaft 11, that is, in a state where the inner circumference 23c_1 is concentric with the shaft 11.

As described above, the washer 23 is preferably positioned such that the center position P1 of the inner circumference 23c_1 coincides with the axis of the shaft 11.

Subsequently, the worker or the like makes the washer 23 perpendicular to the axial direction of the shaft 11 by using the flat region 23d_1 included in the washer 23. For example, as described above, the worker or the like attaches a dial gauge to the shaft 11 and rotates the shaft 11 by one revolution while the tip (measuring element) of the dial gauge is kept pressed against the flat region 23d_1. Thus, the inclination of the flat region 23d_1 with respect to the axial direction of the shaft 11, i.e., the perpendicularity of the washer 23, is measured.

As described above, the flat region 23d_1 preferably extends over the entirety of the periphery of the face of the washer 23 nearer to the encoder 21. Therefore, the washer 23 can be easily made perpendicular to the axial direction of the shaft 11.

If the measured perpendicularity falls within a specified range, the worker or the like determines that the washer 23 has been attached perpendicularly to the axial direction of the shaft 11, and ends the work of positioning the washer 23. In contrast, if the measured perpendicularity exceeds the specified range, the worker or the like changes the positions of the first screw holes 23a (makes the first screw holes 23a coincide with different screw holes 15c), for example. If the perpendicularity does not fall within the specified range even after the change of positions, the washer 23 is replaced with a new one and the above positioning process is performed again with the new washer 23.

Herein, an exemplary case where the perpendicularity of the washer 23 is measured by using the flat region 23d_1 has been described. Alternatively, for example, the perpendicularity may be measured by using a flat region 23c_2 included in the first flange 23c. That is, the washer 23 may includes a region that is flat over the entirety of the periphery thereof on any of the end faces thereof that face toward the axial direction of the shaft 11.

Now, a process of attaching the encoder 21 to the shaft 11 will be described with reference to FIG. 2. The attaching of the encoder 21 to the shaft 11 is performed after the completion of the above process of positioning the washer 23.

First, the worker or the like attaches the slider 170 (see FIG. 3) of the Oldham coupling 22 to the first hub 160 (see FIG. 3) provided on the shaft 11.

Subsequently, the worker or the like aligns the screw holes 211e provided in the body 211 of the encoder 21 with the second screw holes 23b provided in the washer 23. In this state, the worker or the like inserts the screws 32 into the screw holes 211e and 23b and fixes the body 211 to the washer 23.

When the body 211 has been fixed to the washer 23, the rotation input pin 212 is positioned such that the axis thereof coincides with the center position P1 (see FIG. 4B) of the inner circumference 23c_1 of the washer 23. Meanwhile, the washer 23 is positioned such that the center position P1 of the inner circumference 23c_1 coincides with the axis of the shaft 11 through the above process of positioning the washer 23.

Hence, after the worker or the like fixes the body 211 to the washer 23, the worker or the like fits the second hub 180 (see FIG. 3) provided on the rotation input pin 212 onto the slider 170, whereby the rotation input pin 212 and the shaft 11 are coupled to each other with the axes thereof coinciding with each other.

As described above, in the first embodiment, the washer 23 positioned with respect to the shaft 11 is fixed to the counter-load-side bracket 15, and the body 211 of the encoder 21 is then fixed to the washer 23, whereby the rotation input pin 212 is easily positioned with respect to the shaft 11.

The worker or the like can attach the washer 23, the Oldham coupling 22, and the encoder 21 to the shaft 11 all from one side. Specifically, the direction in which the screws 31 are inserted, the direction in which the slider 170 (see FIG. 3) is attached to the first hub 160 (see FIG. 3), the direction in which the second hub 180 (see FIG. 3) is attached to the slider 170, and the direction in which the screws 32 are inserted are all the same, specifically, the positive X direction. Hence, the worker or the like can easily attach or detach the washer 23, the Oldham coupling 22, and the encoder 21 to or from the shaft 11.

Another configuration of the encoder unit 20 will now be described. The encoder unit 20 further includes a lid 24 and a cooling fan unit 25. The lid 24 is a member that covers the opening at the recess 15b provided in the counter-load-side bracket 15 and is fixed to the counter-load-side bracket 15 with screws 33. The encoder 21 is provided in a space in the recess 15b of the counter-load-side bracket 15 covered by the lid 24 and is protected by the counter-load-side bracket 15 and the lid 24.

The cooling fan unit 25 is a member including a cooling fan that cools the motor unit 10 and is provided on the counter load side of the motor unit 10 with respect to the recess 15b of the counter-load-side bracket 15. The motor 1 does not necessarily include the cooling fan unit 25.

Figure 5:
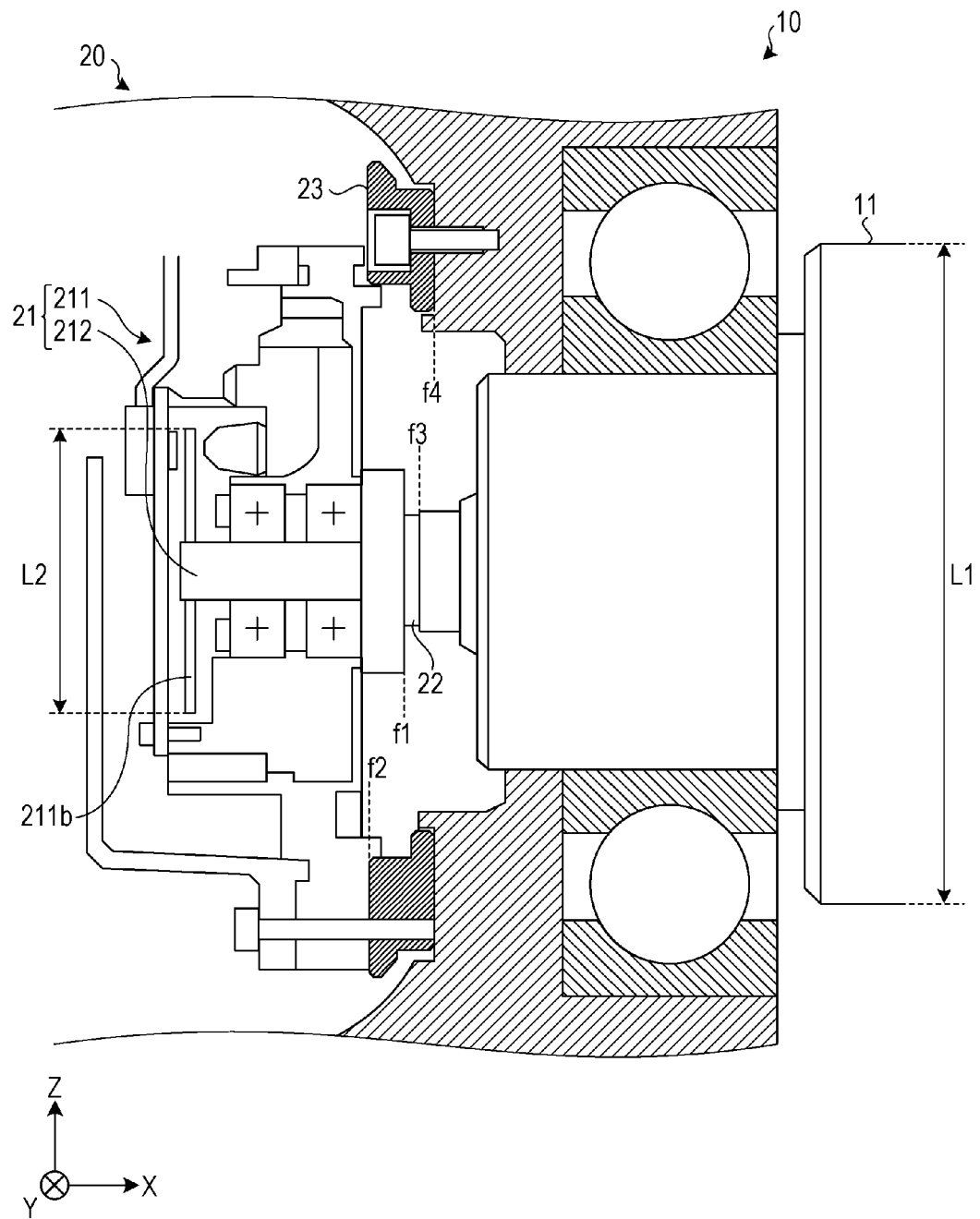
FIG. 5 is a schematic enlarged view illustrating an encoder and peripheral parts illustrated in FIG. 2.

Now, the size relationship between the shaft 11 and the encoder 21 and the positional relationship between the washer 23 and the Oldham coupling 22 will be described with reference to FIG. 5. FIG. 5 is a schematic enlarged view illustrating the encoder 21 and peripheral parts illustrated in FIG. 2.

First, the size relationship between the shaft 11 and the encoder 21 will be described. The shaft 11 included in the motor 1 according to the first embodiment is a large-size shaft having a large diameter. Specifically, as illustrated in FIG. 5, a maximum diameter L1 of the shaft 11 is larger than the diameter of the disc 211b provided on the body 211 of the encoder 21.

The larger the size of the shaft 11, the greater the dimensional tolerances thereof. Accordingly, the larger the size of the shaft 11, the greater the error in the axial position of the shaft 11. Therefore, if the body 211 of the encoder 21 is fixed by using screw holes provided in advance in the counter-load-side bracket 15 and so forth instead of using the washer 23, an axial displacement that exceeds the amount of axial displacement allowed by the Oldham coupling 22 may occur. This is because as the size of the shaft 11 becomes larger, the error in the distance between the center position of each of the screw holes provided in advance in the counter-load-side bracket 15 and so forth and the axis of the shaft 11 becomes greater.

In this respect, the motor 1 according to the first embodiment includes the washer 23. Furthermore, after the washer 23 and the shaft 11 are centered with respect to each other, the body 211 of the encoder 21 is fixed to the washer 23 at the second screw holes 23b provided in the washer 23. Hence, even if there is a large error in the axial position of the shaft 11 because the size of the shaft 11 is large, the position of the washer 23, i.e., the positions of the second screw holes 23b, can be determined in accordance with the error. Therefore, the axis of the rotation input pin 212 can be made to coincide with the axis of the shaft 11, regardless of the error.

If the shaft 11 is a small-size shaft having a small diameter (for example, if the maximum diameter of the shaft 11 is smaller than or equal to the diameter of the disc 211b included in the encoder 21), the dimensional tolerances of the shaft 11 are small. Accordingly, the error in the axial position of the shaft 11 is small. Hence, even if the body 211 of the encoder 21 is fixed at the screw holes provided in advance in the counter-load-side bracket 15 and so forth, the axis of the rotation input pin 212 of the encoder 21 and the axis of the shaft 11 can be made to coincide with each other accurately to some extent.

Next, the positional relationship between the washer 23 and the Oldham coupling 22 will be described. As illustrated in FIG. 5, in the motor 1 according to the first embodiment, an attaching plane f1 between the rotation input pin 212 and the Oldham coupling 22 is preferably nearer to the shaft 11 than an attaching plane f2 between the body 211 of the encoder 21 and the washer 23.

The attaching plane f1 is, specifically, a sliding plane (the flat portion 174b) of the slider 170 (see FIG. 3) for the second hub 180 (see FIG. 3) provided on the rotation input pin 212.

As described above, the attaching plane f1 is set nearer to the shaft 11 than the attaching plane f2. Therefore, comparing with a case where the attaching plane f1 is nearer to the body 211 of the encoder 21 than the attaching plane f2, the encoder unit 20 can be made thinner in the axial direction of the shaft 11.

Moreover, while the motor 1 is in operation, vibrations occur with the rotation of the shaft 11. Such vibrations cause some positional shift in the axis of the shaft 11. If any positional shift in the axis of the shaft 11 occurs, the axis of the shaft 11 is displaced from the axis of the rotation input pin 212. Hence, the slider 170 (see FIG. 3) of the Oldham coupling 22 slides on the first and second hubs 160 and 180 (see FIG. 3) so as to absorb the axial displacement. With such a sliding motion, vibrations in a direction intersecting the axial direction occur in the attaching plane f1 between the slider 170 and the second hub 180. The same applies to an attaching plane f3 between the slider 170 and the first hub 160.

Here, supposing that the attaching plane f1 and the attaching plane f2 extend in the same plane, vibrations that have occurred in the attaching plane f1 tend to be transmitted to the attaching plane f2 in some cases. If such vibrations are transmitted to the body of the encoder 21, the detection accuracy of the encoder 21 may be deteriorated.

In this respect, in the motor 1 according to the first embodiment, the attaching plane f1 is staggered with respect to a plane including the attaching plane f2. Therefore, vibrations that have occurred in the attaching plane f1 are difficult to transmit to the attaching plane f2, and the deterioration in the detection accuracy of the encoder 21 is suppressed.

Furthermore, in the motor 1 according to the first embodiment, the attaching plane f3 between the shaft 11 and the Oldham coupling 22 is preferably nearer to the encoder 21 than an attaching plane f4 between the washer 23 and the counter-load-side bracket 15.

The attaching plane f3 is, specifically, a sliding surface (the flat portion 174a) of the slider 170 (see FIG. 3) for the first hub 160 (see FIG. 3) provided on the shaft 11.

Therefore, in the motor 1 according to the first embodiment, vibrations that have occurred in the attaching plane f3 are difficult to transmit to the attaching plane f4. Consequently, the deterioration in the detection accuracy of the encoder 21 is further suppressed, and the displacement of the washer 23 is also reduced.

According to studies conducted by the inventors and other fellows, in a case where a plane to which vibrations are to be transmitted is staggered with respect to a vibration-occurring plane as in the first embodiment, vibration components and rigidity in directions different from the direction in which the vibration-occurring plane extends are considered to contribute to making the transmission of vibrations difficult. Note that the mechanism of reducing the transmission of vibrations described herein is only based on studies conducted by the inventors and other fellows, and the configuration according to the first embodiment can also reduce the transmission of vibrations by using any other mechanisms, of course.

As described above, the motor 1 according to the first embodiment includes the motor unit 10, the encoder 21, the Oldham coupling 22, and the washer 23. The motor unit 10 includes the shaft 11. The encoder 21 includes the body 211 and the rotation input pin 212 rotatably provided on the body 211. The Oldham coupling 22 couples the rotation input pin 212 of the encoder 21 and the shaft 11 while allowing any relative displacement in a direction intersecting the axial direction. The washer 23 is attached to the motor unit 10 while being positioned with respect to the shaft 11, and has the second screw holes 23b at which the body 211 of the encoder 21 is attached to the washer. Hence, in the motor 1 according to the first embodiment, the attaching/detaching of the encoder 21 to/from the shaft 11 is facilitated.

Second Embodiment

While the first embodiment described above concerns an exemplary case where the washer is a member having a substantially cylindrical shape, the shape of the washer is not limited to a substantially cylindrical shape. The following description concerns another exemplary configuration of the washer.

Figure 6:
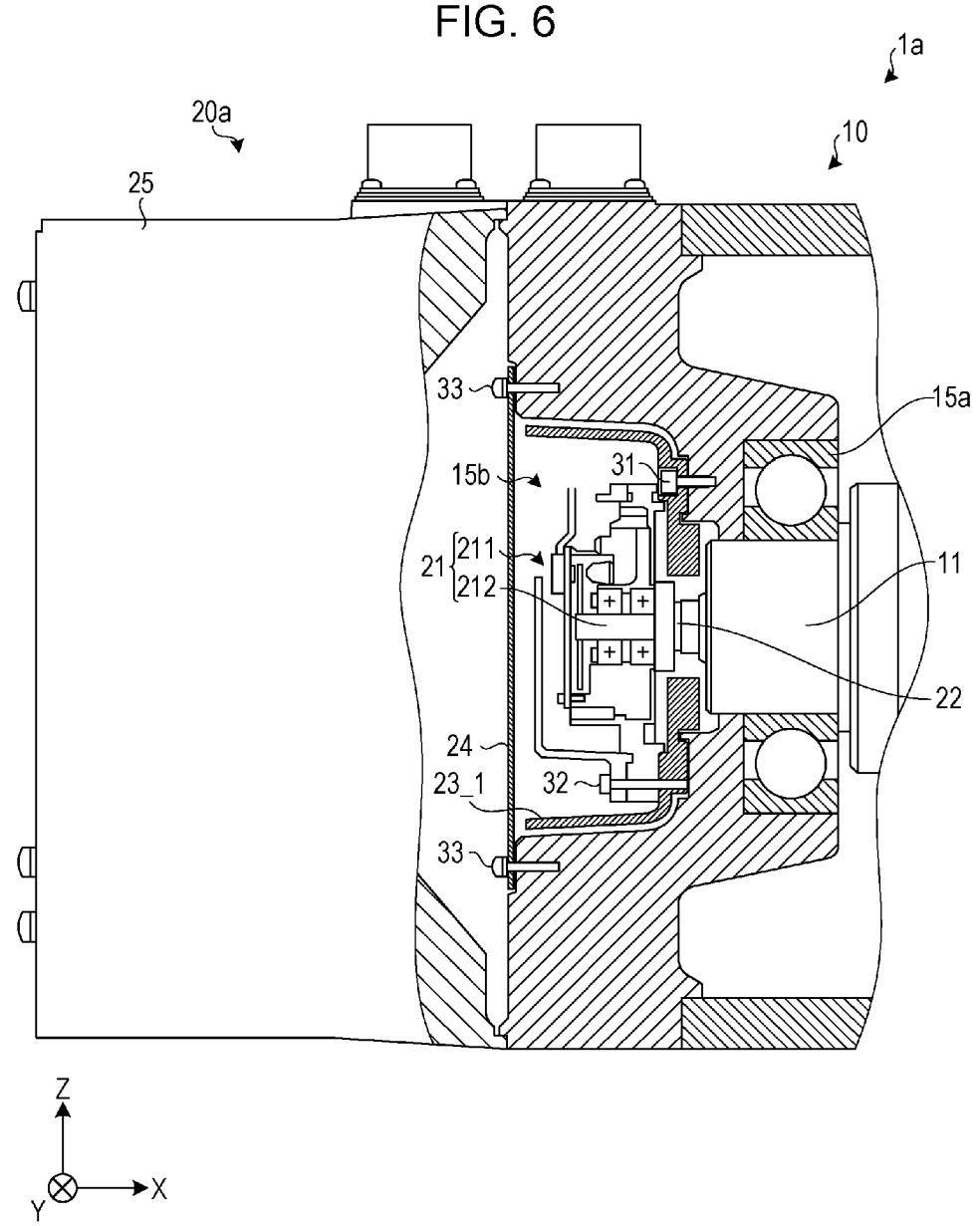
FIG. 6 is a schematic sectional side view of a motor according to a second embodiment.

FIG. 6 is a schematic sectional side view of a motor 1a according to a second embodiment. In the following description, elements the same as those described above are denoted by the reference numerals given to the above-described elements, and redundant description is omitted.

As illustrated in FIG. 6, the motor 1a according to the second embodiment includes an encoder unit 20a instead of the encoder unit 20 according to the first embodiment. The encoder unit 20a includes a washer 23_1 instead of the washer 23 according to the first embodiment.

The washer 23_1 is a member having a substantially cup-like shape that covers the encoder 21. The washer 23_1 is made of a metal material, such as iron, having high magnetic permeability.

Figure 7A:
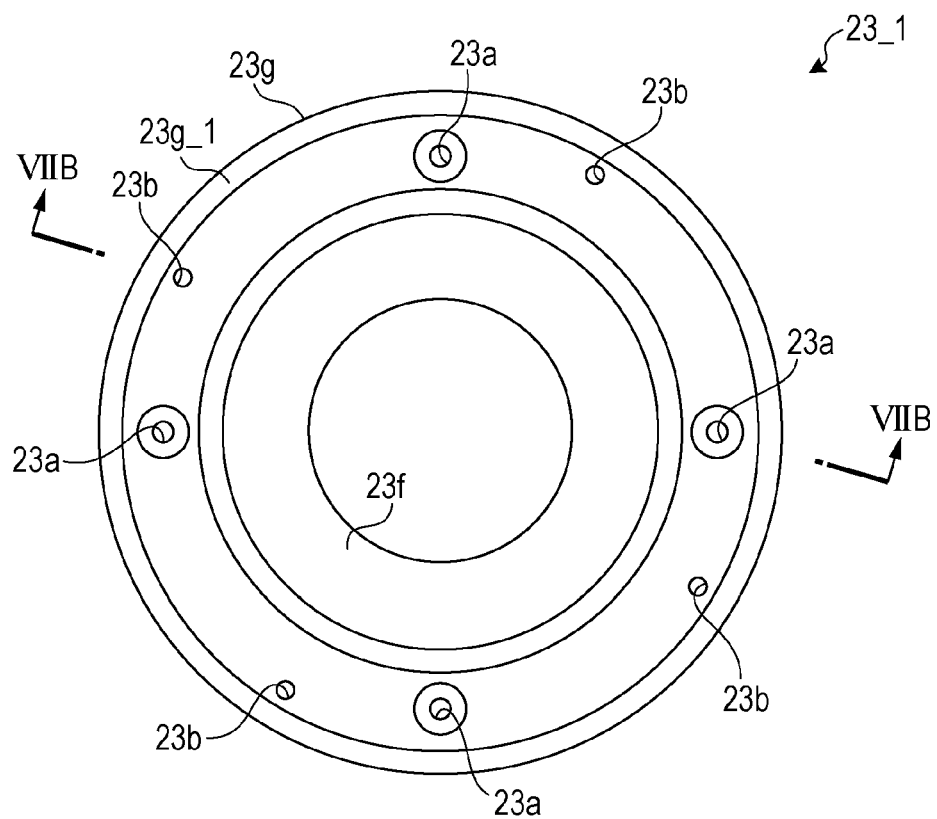
FIG. 7A is a schematic front view of a washer according to the second embodiment.
Figure 7B:
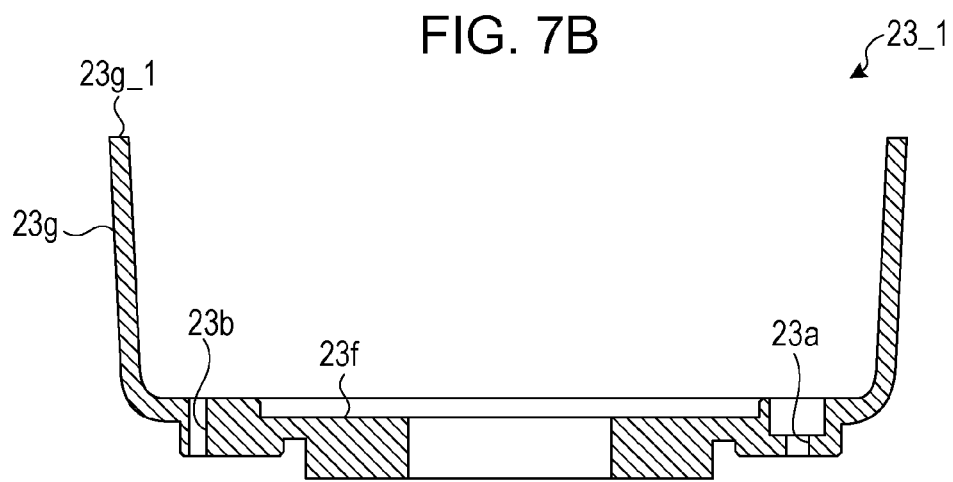
FIG. 7B is a schematic sectional view taken along line VIIB-VIIB and seen in the direction of the arrows in FIG. 7A.

Here, a configuration of the washer 23_1 will be described with reference to FIGS. 7A and 7B. FIG. 7A is a schematic front view of the washer according to the second embodiment. FIG. 7B is a schematic sectional view taken along line VIIB-VIIB and seen in the direction of the arrows in FIG. 7A.

As illustrated in FIG. 7A, a first flange 23f included in the washer 23_1 has a shape projecting radially inward more than the first flange 23c of the washer 23 according to the first embodiment. Specifically, the first flange 23f projects up to a position between the body 211 of the encoder 21 and the shaft 11 (see FIG. 6).

Furthermore, as illustrated in FIG. 7B, the washer 23_1 includes a sidewall 23g. The sidewall 23g has such a shape that the second flange 23d included in the washer 23 according to the first embodiment is extended along the recess 15b of the counter-load-side bracket 15 (see FIG. 6). That is, the sidewall 23g resides between the counter-load-side bracket 15 and the body 211 of the encoder 21.

The upper end face of the sidewall 23g preferably forms a flat region 23g_1 that is flat over the entirety thereof. Hence, the worker or the like can make the washer 23_1 perpendicular to the axial direction of the shaft 11 by using the flat region 23g_1.

As illustrated in FIG. 7A, the washer 23_1 has first screw holes 23a and second screw holes 23b that are provided at the same positions as those of the washer 23 according to the first embodiment.

The washer 23_1 configured as described above functions not only as a member that positions the rotation input pin 212 but also as a magnetic shield that protects the encoder 21 from magnetism on the outside.

For example, in a case where the motor unit 10 includes an electromagnetic brake that brakes the shaft 11, the electromagnetic brake is provided on the counter load side of the shaft 11, i.e., near the encoder 21. In such a case, a magnetic flux produced by the electromagnetic brake may run through the shaft 11 to the encoder 21 and influences the output of the encoder 21.

In this respect, in the motor 1a according to the second embodiment, the washer 23_1 is made of a metal material having high magnetic permeability. Furthermore, the first flange 23f resides between the body 211 of the encoder 21 and the shaft 11. Hence, the magnetic flux produced by the electromagnetic brake flows into the first flange 23f of the washer 23_1. Furthermore, the magnetic flux that has reached the washer 23_1 runs from the first flange 23f through the sidewall 23g and exits to the outside. Hence, the magnetic flux produced by the electromagnetic brake does not reach the encoder 21.

Furthermore, in the motor 1a, any magnetic flux produced on the outside may run through the counter-load-side bracket 15 in the radial direction of the shaft 11 and enter the recess 15b of the counter-load-side bracket 15. The washer 23_1, however, has the sidewall 23g residing between the counter-load-side bracket 15 and the body 211 of the encoder 21. Therefore, such a magnetic flux does not reach the encoder 21.

As described above, in the second embodiment, the washer 23_1 has a substantially cup-like shape, and the encoder 21 is provided on the inner side of the washer 23_1. Hence, the influence of any magnetic flux upon the encoder 21 is reduced.

While the above embodiments each concern an exemplary case where the body 211 of the encoder 21 is fixed to the washer 23 or 23_1 with screws, the method of fixing the body 211 of the encoder 21 to the washer 23 or 23_1 is not limited to using screws. That is, the attaching portions included in the washer 23 or 23_1 for attaching the body 211 to the washer 23 or 23_1 are not limited to screw holes such as the second screw holes 23b.

Other effects and modifications can be easily derived by those skilled in the art. Hence, broader embodiments of the present disclosure are not limited by the specific and detailed typical embodiments illustrated and described above. Therefore, various changes can be made to those embodiments without departing from the spirit or scope of the general concept of the invention defined by the appended claims and their equivalents.

It should be understood by those skilled in the art that various modifications, combinations, sub-combinations and alterations may occur depending on design requirements and other factors insofar as they are within the scope of the appended claims or the equivalents thereof.

What is claimed is:

1. A rotating electric machine comprising:
   a rotating-electric-machine unit including a shaft;
   a rotation detector including a body and a rotation input pin that is rotatably provided on the body;
   an Oldham coupling that couples the rotation input pin of the rotation detector and the shaft to each other while allowing any relative displacement in a direction intersecting an axial direction; and
   a washer provided on the rotating-electric-machine unit while being positioned with respect to the shaft, the washer including an attaching portion at which the body of the rotation detector is directly attached to the washer, an attaching plane between the rotation input pin and the Oldham coupling being nearer to the shaft than an attaching plane between the washer and the body of the rotation detector.

2. The rotating electric machine according to claim 1, wherein the body of the rotation detector includes
- a disc having a predetermined pattern and that rotates together with the rotation input pin; and
- a light-emitting element and a light-receiving element that are provided across the disc from each other, and wherein the shaft has a larger diameter than the disc.

3. The rotating electric machine according to claim 1, wherein an attaching plane between the shaft and the Oldham coupling is nearer to the rotation detector than an attaching plane between the washer and the rotating-electric-machine unit.

4. The rotating electric machine according to claim 1, wherein the washer is
- a cylindrical member provided such that an inner circumference thereof is concentric with the shaft, the washer including, in one end face thereof in the axial direction, a region that is flat over the entirety of a periphery of the end face.

5. A rotating electric machine comprising:
- a rotating-electric-machine unit including a shaft;
- a rotation detector including a body and a rotation input pin that is rotatably provided on the body;
- an Oldham coupling that couples the rotation input pin of the rotation detector and the shaft to each other while allowing any relative displacement in a direction intersecting an axial direction; and
- a washer provided on the rotating-electric-machine unit while being positioned with respect to the shaft, the washer including an attaching portion at which the body of the rotation detector is attached to the washer, wherein an attaching plane between the rotation input pin and the Oldham coupling is nearer to the shaft than an attaching plane between the washer and the body of the rotation detector.

6. The rotating electric machine according to claim 5, wherein an attaching plane between the shaft and the Oldham coupling is nearer to the rotation detector than an attaching plane between the washer and the rotating-electric-machine unit.

7. A rotating electric machine comprising:
- a rotating-electric-machine unit including a shaft;
- a rotation detector including a body and a rotation input pin that is rotatably provided on the body;
- an Oldham coupling that couples the rotation input pin of the rotation detector and the shaft to each other while allowing any relative displacement in a direction intersecting an axial direction; and
- a washer provided on the rotating-electric-machine unit while being positioned with respect to the shaft, the washer including an attaching portion at which the body of the rotation detector is attached to the washer, wherein an attaching plane between the shaft and the Oldham coupling is nearer to the rotation detector than an attaching plane between the washer and the rotating-electric-machine unit.

* * * * *